United States Patent [19]

Nigg et al.

[11] 4,172,642

[45] Oct. 30, 1979

[54] PRINTING CHARACTER MATRIX AND A PROCESS OF MAKING SAME

[75] Inventors: Fritz Nigg, Bussigny; Jean-Claude Risse, Prangins, both of Switzerland

[73] Assignee: J. Bobst & Fils, S.A., Lausanne, Switzerland

[21] Appl. No.: 895,112

[22] Filed: Apr. 10, 1978

[30] Foreign Application Priority Data

Apr. 14, 1977 [CH] Switzerland .................... 004616/77

[51] Int. Cl.$^2$ .............................. G03B 17/06

[52] U.S. Cl. .............................. 354/15

[58] Field of Search .............................. 354/5, 13–15, 354/17–19

[56] References Cited

U.S. PATENT DOCUMENTS

| | | | |
|---|---|---|---|
| 3,738,236 | 6/1973 | Grube et al. | 354/15 |
| 3,766,838 | 10/1973 | Knoll et al. | 354/15 |
| 4,015,273 | 3/1977 | Linde et al. | 354/15 |

*Primary Examiner*—Donald A. Griffin

*Attorney, Agent, or Firm*—Hill, Van Santen, Steadman, Chiara & Simpson

[57] ABSTRACT

A printing character matrix and a process for assembling characterized by a hollow cylinder rotatably disposed within a housing and having a plurality of circumferential grooves on its circumferential surface. Each of the circumferential grooves has sides lying in parallel planes which are parallel to the base of the cylinder and the cylinder has strips secured on its cylindrical surface and overlapping the sides of the two adjacent grooves to form means for positioning a character carrying member such as a photographic film containing the characters. To ensure axial position of each of the characters, each groove is provided with means biasing the member against one of the sides thereof and the device utilizing centrifugal force to hold the member on the positioning means. Preferably, the housing is provided with a filter so that air drawn through the cylinder as it is being rotated is free from undesirable particles.

7 Claims, 10 Drawing Figures

PRINTING CHARACTER MATRIX AND A PROCESS OF MAKING SAME

BACKGROUND OF THE INVENTION

1. Field of the Invention

The present invention is directed to a printing character matrix and a process of forming the matrix.

2. Prior Art

Character matrices, which are now presently used in photo-type setting devices, have been made in various forms. One of these forms consists of using a support which comprises a glass disk or a disk of transparent material, which is covered with a layer of photographic emulsion. The various signs, symbols or characters are formed in the emulsion layer on the disk by a photographic process. The disk may include several rows of characters, signs or symbols arranged concentrically with one another.

Another form of character matrix utilizes a cylinder, which has appropriate apertures. A character support, such as a bit of photographic film, is fitted in front of each of the apertures in the cylinder wall. These film bits are fitted mechanically either by gluing them in each of the apertures or by holding them magnetically in the apertures of the cylinder wall.

Another possibility of a character matrix consists of a frame composed of a plurality of segments, such as four segments. Photographic film bits, which carry the various characters are glued on each of these segments, which are usually made of light metal.

Character matrices such as the above described type have special advantages in their use. However, in the case where the user chooses a matrix having the shape of a cylinder or drum, they will always encounter trouble both with the fastening and interchangeability of the various fonts making up the matrix. Since the fastening of the fonts requires particular care, these forms of matrices are expensive to make and produce. Moreover, the various fonts are provided in most cases with metal parts carried over the photographic film, which fact produces major registry problems.

SUMMARY OF THE INVENTION

The present invention is directed to a character matrix and the method of making the matrix is very easy to utilize, is inexpensive to produce, and yet has the same features of the conventional matrices.

To accomplish these tasks, the character matrix comprises a hollow cylinder having a cylindrical surface mounted for rotation in a housing, the cylinder has a plurality of circumferential grooves axially spaced on the surface of the cylinder with sides of each of the grooves lying in parallel planes which are parallel to a plane of the base of the cylinder, means disposed adjacent the junction of the cylindrical surface and each side of each groove for positioning a character carrier member at said junction, means associated with each groove for urging the edge of the carrier member disposed in the groove against one of the sides of said groove, and the housing having means for filtering air flowing into the cylinder as the cylinder is rotated within said housing, Preferably, the means for positioning comprises a band attached on the cylindrical surface between adjacent grooves and extending over the side edges of the two adjacent grooves to form said positioning means. The means for biasing comprises a groove portion adjacent one side wall of each groove, said portion receiving an annular washer with means urging the washer towards the opposite side of the groove.

Means for rotating the cylinder includes a hub disposed in the housing and the hub has means for detachable connecting the cylinder on the hub. The means for detachably connecting includes a plurality of segments slidably mounted on the hub and having tapered engagement surfaces engaging matching engagement surface on the cylinder under the influence of centrifugal force.

A process for making the character matrix includes providing the rotatable cylinder having the circumferential grooves with means for positioning at the junction of the sides of the grooves and the cylindrical surface, inserting a carrier member containing at least one character into each groove, positioning each member in the groove in both a circumferential and axial position and using centrifugal force created by the rotating cylinder to hold the member on the means for positioning.

FIG. *7a* and *7b* represents a plan view and an end view of one type of character font;

FIG. *7c* is a plan view of another type of character font; and

Figure 8:
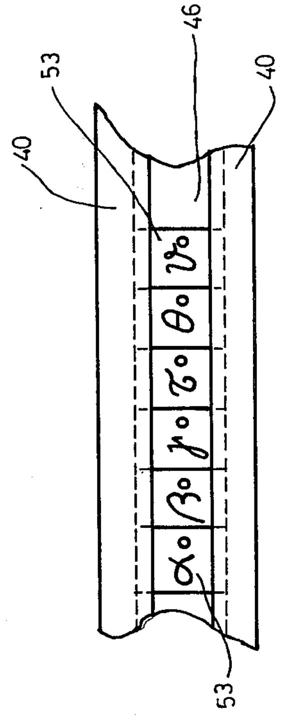

FIG. 8 represents the arrangement of a series of character fonts in accordance to FIG. *7c* located within a cylinder groove.

DESCRIPTION OF THE PREFERRED EMBODIMENTS

The principles of the present invention are particularly useful in producing a character matrix generally indicated at 1 which is contained in the housing generally indicated at 18.

Figure 1:
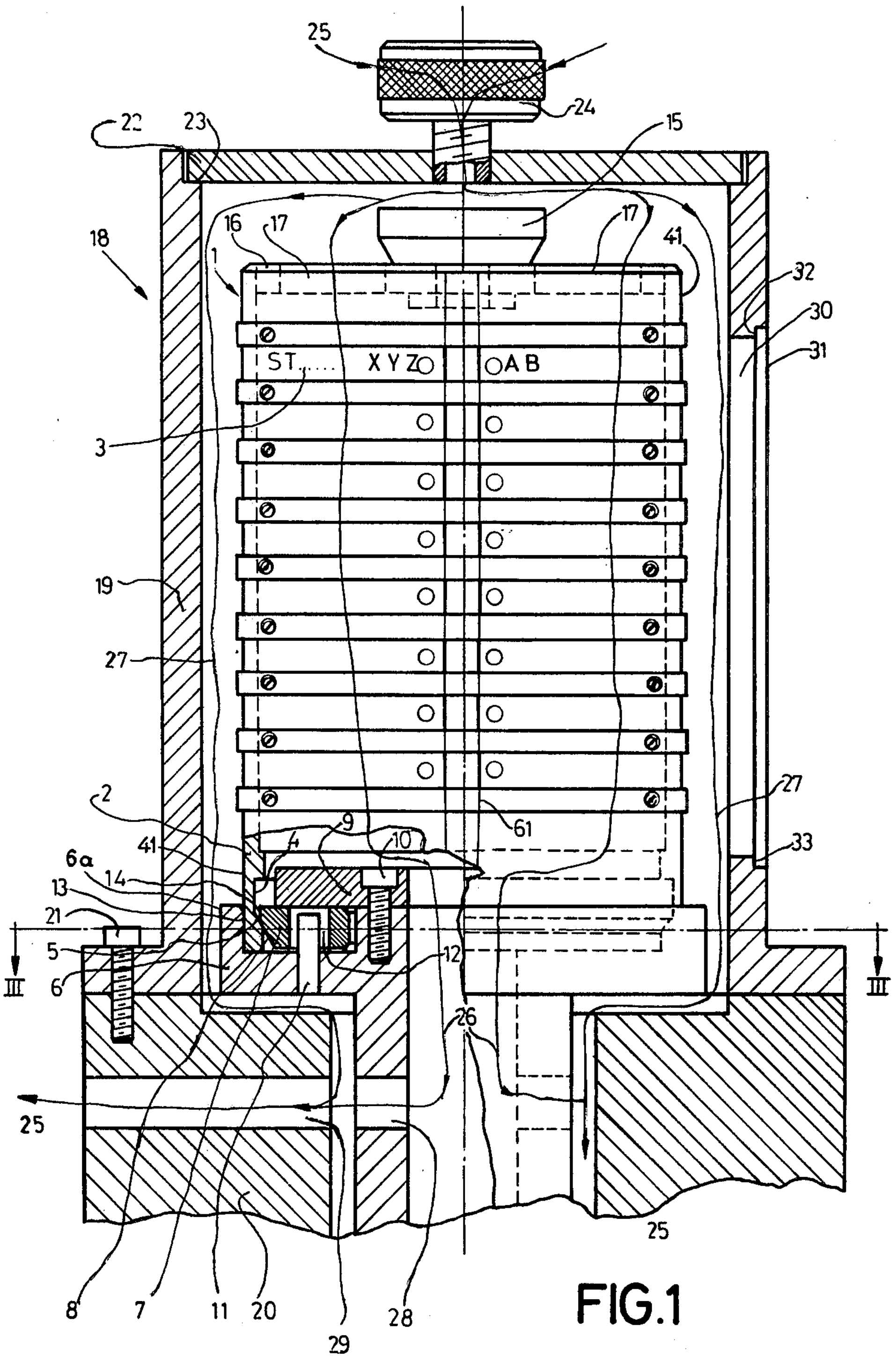
FIG. 1 is a cross-sectional view with portions in elevation for purposes of illustration of a character matrix in accordance with the present invention disposed in the housing.

The character matrix 1 includes a cylinder 2 having a cylindrical outer wall 41 and provided with a plurality of axial spaced, circumferential grooves 34 (FIG. 4) for receiving fonts 3 of character and as illustrated in FIG. 1, the cylinder 2 has eight grooves for receiving eight character fonts 3. The cylinder 2 at one end has a base section or portion 4 for mounting the cylinder on a hub 6 for rotation within the housing 18. The cylinder 2 at an opposite end 16 is provided with a handle 15 and has aperture 17 which allows air to pass into the cylinder 2.

Figure 3:
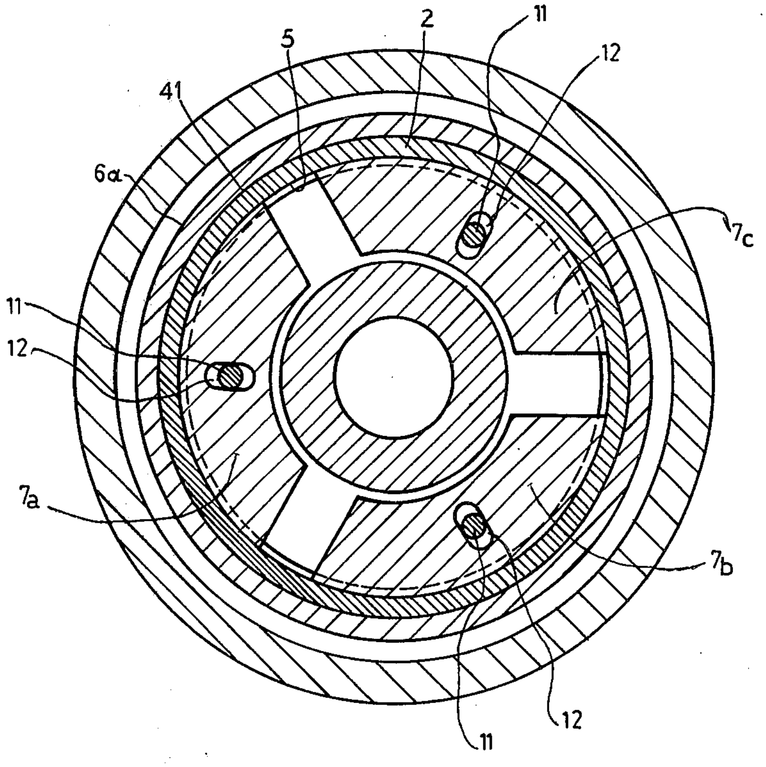
FIG. 3 is a cross-sectional view taken along lines III—III of FIG. 1.

The hub 6 extends from a shaft connected to a source of rotational movement and has one end machined to provide an inner surface 13 that defines an annular flange 6*a* which telescopically receives the cylindrical surface 41 of the cylinder 2 as the cylinder is detachably mounted on the hub. To detachably mount the cylinder 2 on the hub 6, the portion 4 has an inner tapering surface 5, which coacts with matching tapering surfaces 8 disposed on a ring-shaped member 7 that is formed by segments 7*a*, 7*b* and 7*c* (see FIG. 3). The taper or conical surface 8 on the segment 7*a*, 7*b* and 7*c* is the same as the taper or conical surface 5. Each of the segments 7*a*, 7*b* and 7*c* has a slot 12 loosely receiving a pin 11 extending from the hub and the segments are held on the hub by a ring 9 (FIG. 1) attached to the hub by fastening means such as screws 10 so that each of the segments 7*a*, 7*b* and 7*c* is free to move radially on the hub in response to centrifugal force. Thus, under the effect of the centripetal force generated by the revolving of the hub 6, the segments 7*a*, 7*b* and 7*c* are pressed radially outward against the cylinder 2 with the engagement surfaces 5 and 8 being in contact to hold the cylinder 2 tightly on the hub. However, when the cylinder 2 is stationary, it can be easily changed by merely lifting the cylinder 2 axially upward with the tapered surface 5 camming or forcing the segments 7*a*, 7*b* and 7*c* radially inward to release the cylinder, so that the portion 4 can pass between the inner wall 13 of the hub and the outer walls 14 of each of the segments.

Figure 2:
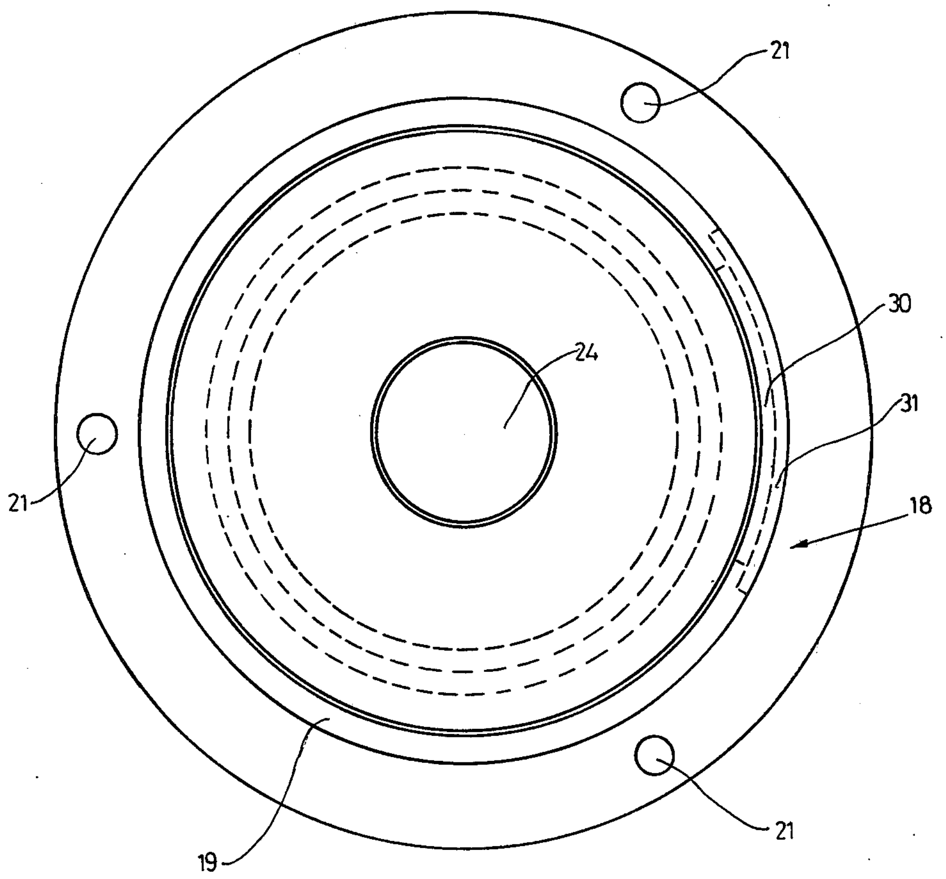
FIG. 2 is a top view of the device illustrated in FIG. 1.

As illustrated, the cylinder is mounted on the hub 6 within the housing 18, which consists of a mantle or bell-shaped member 19 secured on a frame 20 by means of fasteners such as screws 21. The mantle or member 19 is closed at the opposite end by a lid 22, which is received on a shoulder 23 which was machined on the upper end of the mantle 19. The lid 22 is provided with an air filter 24. Thus, during revolving of the matrix 1, a pumping of the ambient air causes air to be drawn through the filter 24 as indicated by the arrows 25 and the filter removes infinitely small particles of oil or other impurities so that they will not settle on the fonts 3 in the grooves and, therefore, impair the reproduction quality of the characters. The air will flow through the center of the cylinder 2 and also around the cylinder 2 as indicated by arrow 27 to a passage 26 in the shaft of the hub 6 before being exhausted through passages 28 and 29 which are in the shaft and the frame 20, respectively. The cylindrical mantle or bell forming the portion of the housing 18 is provided with a window 30 (FIGS. 1 and 2), which is closed by a screen 31 that is secured such as by gluing on shoulders 32 and 33. This window enables light originating from a flash light which is not illustrated to penetrate into the housing during a step of exposing one or more characters carried by the fonts.

Figure 4:
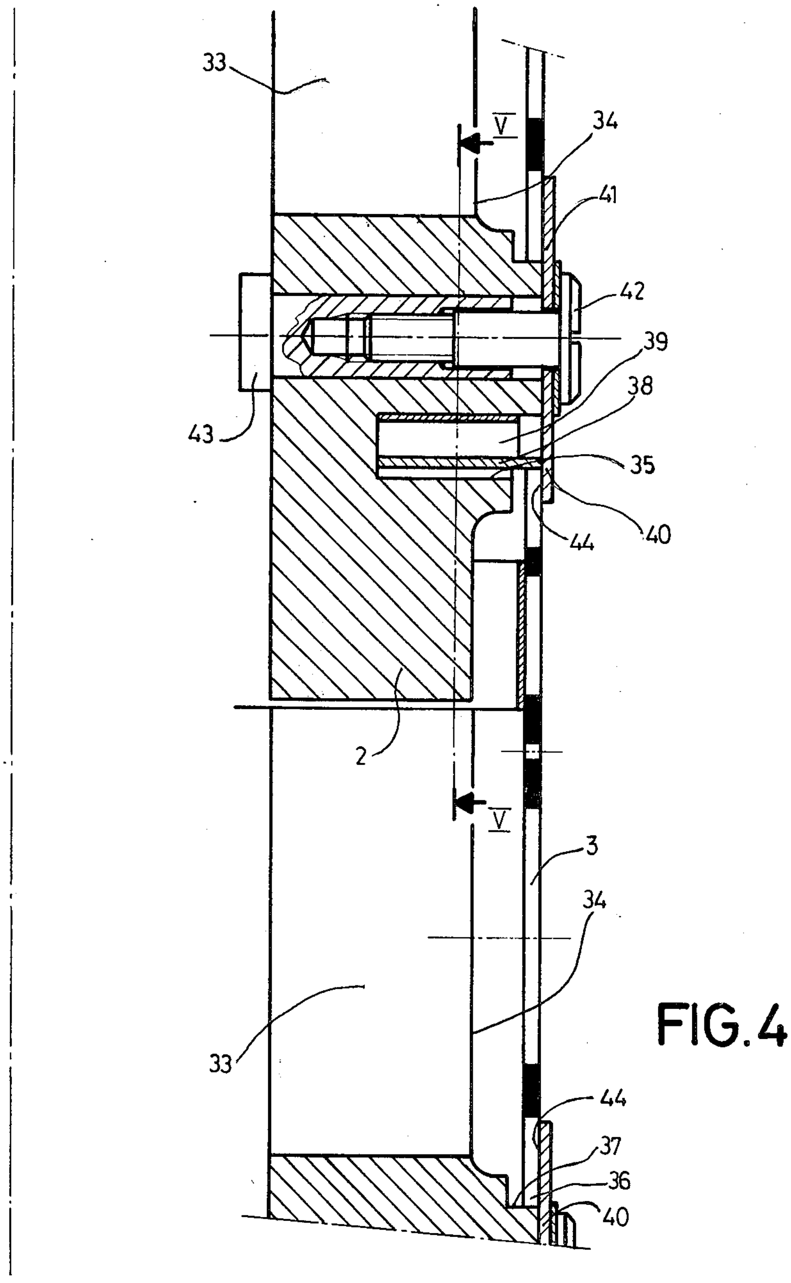
FIG. 4 is a partial cross-sectional view with portions of the cylinder wall of the character matrix of FIG. 1.
Figure 5:
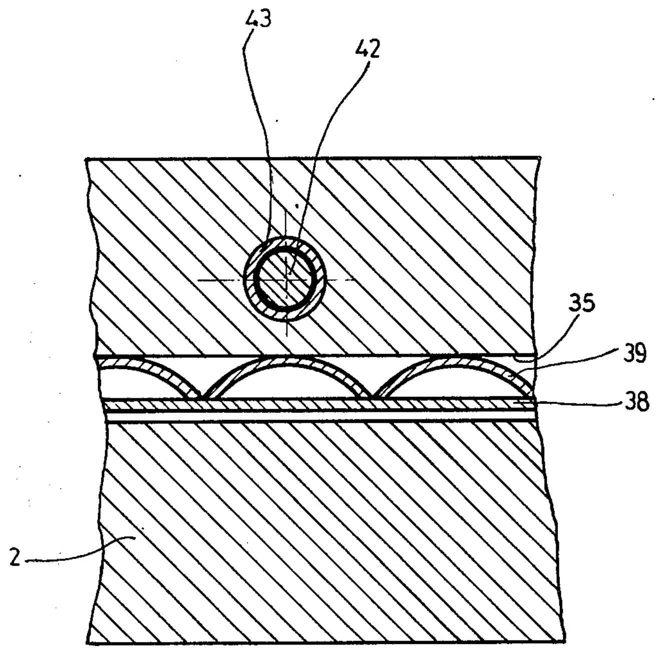
FIG. 5 is a cross-sectional view taken along lines V—V of FIG. 4.

As best illustrated in FIG. 4, the cylinder 2 is provided with circumferentially extending grooves 34, which are in communication with apertures 33 extending through the cylinder wall. Adjacent each of the grooves 34 is a second groove portion or groove 35, which forms means for biasing a base 36 of the font 3 against a side wall or side 37 of the groove 34. The means received in the groove portion 35 includes an annular disk 38 and semi-circular springs 39 (FIG. 5). The font 3 is held on the surface 41 of the cylinder 2 by means of positioning means, which include a ring or strip 40 secured on the outer surface 41 of the cylinder 2 by means of screws 42 which are illustrated as being threaded into the screws 43. The centrifugal forces press the fonts 3 against the inner surfaces 44 of the rings or strips 40 so that the font will be positioned at the junction between the cylindrical surface 41 and the side walls such as 37. As illustrated, it is noted that each of the rings 40 overlaps a portion of the adjacent grooves 34.

Figure 6:
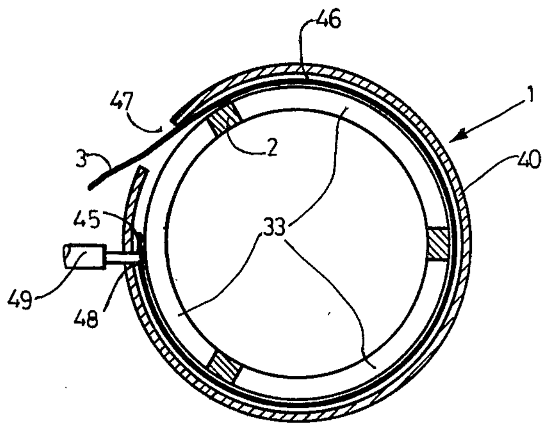
FIG. 6 is a cross-sectional view schematically illustrating the introduction of a character font into the matrix in accordance with the present invention.

To introduce a font 3 into a groove of the matrix 1, the strips 40 are provided with an aperture 47 (FIG. 6). Each of the strip-like fonts are provided at each end with apertures or openings 52 or 54 (FIG. 7*a* or 7*c*) so that an end 48 of a tool 49 may be inserted in the aperture and utilized to guide and pull the font around the groove 46 of the matrix. As illustrated in FIG. 6, the leading end 45 of the font 3 is inserted through the aperture 47 and into the groove 46 and then guided by the tool 49 to circumferentially move around it in the groove 46. It should be noted that after inserting the font in the groove 46, the centrifugal force which is created during rotation of the matrix in the housing will cause the font to move against the positioning means formed by the rings or strips 40.

Figure 7C:
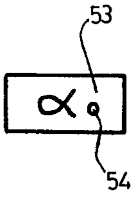
Figures 7A, 7B:
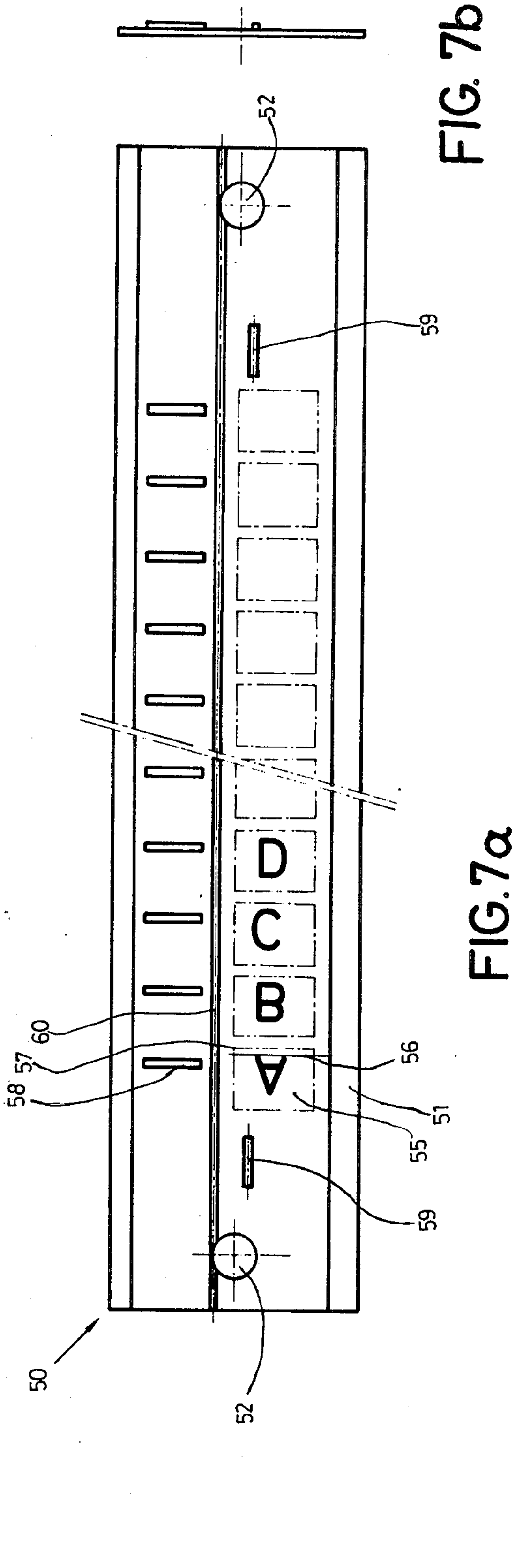

One type of font is illustrated in FIGS. 7*a* and *b*, and is generally indicated at 50. The font 50 is made of a tape or strip 51 of photographic film on which the characters such as 55 appear as bright designs on a black background. All of the characters 55 are put on the tape which has a length that is practically the same as the outer circumference of the cylinder 2. Each character 55 is aligned on the font 50 with the basic line 56 as well as a lateral reference line 57. Each basic line 56 has its alignment marks such as 58 and the lateral reference line 57 has two alignment marks 59, 59 which are located adjacent the ends of the font. The alignment marks are to provide the necessary data for the vertical character position within the line being composed, so that all characters making up a line will be aligned in the same way. The purpose of the alignment marks 59 is to set the lateral position of the characters within a line being composed in such a way that all the characters will be arranged perpendicularly to their basic lines. For easier reading of the characters as well as checking out their position, the alignment marks 59 have a relationship with another continuous mark 60 which extends parallel to a line between the two alignment marks 59. The alignment marks 58, 59 and 60 consist of small reflective strips glued onto the font 50 so that the reference marks may be reflectively read. As the apparatus for scanning the reference marks 58, 59 and 60 is located outside the font, it is thus possible to use the matrix height to its maximum for fitting character fonts. From an experience with photographic film, red light will produce outstanding results for detecting the reference marks 58, 59 and 60. The font 50 is provided with two holes such as 52 destined to ensure easy fitting of the font into the matrix when using a tool such as 49. The various fonts fitted within their grooves are aligned at their ends with the reference line 61 (FIG. 1). This alignment though does not provide a particular accuracy since detecting and registering of the characters carried by the font are achieved electronically by scanning a basic reference called point zero which every font is provided.

In the type of font illustrated in FIGS. 7*c* and 8, a bit 53 (FIG. 7*c*) of photographic film has a special character called a "half case" provided thereon. A "half case" is a special character that generally does not appear on conventional character fonts since it is used relatively rarely and would represent an additional load for the font. The photographic film bit 53 also has a hole 54, which enables easy insertion of the bit into the matrix.

As illustrated in FIG. 8, a font sequence of bits 53 are located in a groove 46 of the cylinder 2 and positioned therein by the bands or strips 40.

An important feature of the matrix of the present invention is that the user of the matrix is thus provided with a simple and easy means of enabling the mixing of conventional fonts and half case character fonts in one matrix. Since the fonts used are made of simple photographic film, another important advantage is the fact that the fonts may have a low cost price. The interchangeability of the matrix by means of a tool is also an important advantage enabling quick adaptation of composing works requiring the use of several different matrices. Thus, the detachable connection formed between the mating tapered surface 5 of the cylinder 2 and the mating surfaces of the segment 7 enables a rapid change of one matrix and its replacement by another similar matrix containing different fonts.

Although various minor modifications may be suggested by those versed in the art, it should be understood that we wish to embody within the scope of the patent warranted hereon all such modifications as reasonably and properly come within the scope of our contribution to the art.

We claim:

1. A character matrix comprising a hollow cylinder having a cylindrical surface mounted for rotation in a housing, said cylinder having a plurality of circumferential grooves axially spaced on a surface of the cylinder with the sides of each groove lying in parallel planes which are parallel to a plane of the base of said cylinder, means disposed adjacent the junction of the cylindrical surface and each side of each of the grooves for positioning a character carrier member at said junction, means associated with each groove for biasing an edge of a carrier member disposed in the groove against one of the sides of said groove, and said housing having means for filtering air flowing into the cylinder as the cylinder is rotated within said housing.

2. A device according to claim 1, wherein the means for biasing comprises a groove portion adjacent one side of each groove, said portion receiving an annular washer with means urging said washer towards the opposite side of the groove.

3. A device according to claim 1, wherein the means for positioning comprises a band attached on the cylindrical surface between adjacent grooves and extending over the side edges of the two adjacent grooves to form said positioning means.

4. A device according to claim 1, wherein the means for rotating said cylinder includes a hub disposed in said housing, said hub having means for detachably connecting the cylinder on said hub and in axial alignment therewith.

5. A device according to claim 4, wherein said means for detachably connecting comprises engagement surfaces disposed on segments slidably mounted on said hub, said segments being urged into engagement with the end of the cylinder by centrifugal force.

6. A device according to claim 5, wherein each of the segments has a tapering engagement surface and the cylinder has a matching engagement surface engaged thereby.

7. A process for making a character matrix comprising providing a rotatable cylinder having a circumferential groove with means for positioning a character carrier member at the junction of the sides of each groove and the cylindrical surface, said means for positioning including means for biasing an edge of the carrier member against one side of each groove, inserting a carrier member containing at least one character into each groove, positioning each member in the groove in both a circumferential and axial position with said means for biasing urging the member to the axial position and using a centrifugal force of the rotating cylinder to hold said member on the means for positioning.

* * * * *